June 17, 1941.   D. HEYER   2,245,667
VARIABLE SPEED TRANSMISSION DEVICE
Filed July 31, 1935   5 Sheets-Sheet 3

INVENTOR
DON HEYER.
BY John Flam
ATTORNEY

June 17, 1941.    D. HEYER    2,245,667
VARIABLE SPEED TRANSMISSION DEVICE
Filed July 31, 1935    5 Sheets-Sheet 4

INVENTOR
Don Heyer
BY John Flam
ATTORNEY

Patented June 17, 1941

2,245,667

UNITED STATES PATENT OFFICE 2,245,667

VARIABLE SPEED TRANSMISSION DEVICE

Don Heyer, Los Angeles, Calif., assignor to U. S Electrical Motors Inc., Los Angeles, Calif., a corporation of California Application July 31, 1935, Serial No. 34,049

14 Claims. (Cl. 74—230.17)

This invention relates to adjustable speed transmissions, and more particularly to an adjustable speed transmission having a driving shaft in driving relation to a driving pulley structure, a driven pulley structure in driving relation to a load driving shaft, and a belt for transmitting power from the driving pulley structure to the driven pulley structure, at least one of the pulley structures having an adjustable effective pulley diameter, whereby the variation of speed ratio is obtained.

Such an adjustable pulley structure may include a pair of pulley sections having opposed inclined faces forming a seat for a wedge-shaped driving belt. In order to provide means for adjusting the effective diameter of the pulley structure, the pulley sections are made relatively axially adjustable. In this way the inclined faces can be brought closer together, causing the belt to be urged radially outward to produce an increased effective diameter; or they can be separated, causing the belt to contact with the inclined faces at a shorter radial distance to produce a decreased effective diameter.

The variable speed transmission may have two adjustable pulley structures, or it may include one adjustable pulley structure and one pulley having a fixed effective diameter. When only one adjustable diameter pulley structure is employed, the belt may be maintained in active driving relation to the pulleys by adjusting the center distance between the axes of the two pulleys in accordance with the adjustment of the adjustable pulley structure. When two adjustable pulley structures are employed, the pulley structures are arranged to be oppositely adjustable, that is, an increase in effective diameter of one of the pulley structures is accompanied by a compensating decrease in the effective diameter of the other of the pulley structures.

Such variable speed transmissions have been described in several of my earlier applications, which can be identified as follows:

Don Heyer, Variable speed transmission device, Serial No. 452,108, filed May 13, 1930, now Patent No. 2,214,854, issued September 17, 1940;

Don Heyer, Variable speed transmission device, Serial No. 631,533, filed September 2, 1932;

Don Heyer, Variable speed power unit, Serial No. 640,707, filed November 1, 1932, now Patent No. 2,078,196, issued April 20, 1937;

Don Heyer et al., Variable speed electric power unit, Serial No. 659,684, filed March 6, 1933, now Patent No. 2,198,940, issued April 30, 1940;

Don Heyer, Variable speed drive with multiple belts, Serial No. 667,379, filed Apr. 22, 1933;

Don Heyer et al., Variable speed power unit, Serial No. 679,034, filed July 5, 1933, now Patent No. 2,202,554, issued May 28, 1940;

Don Heyer et al., Variable speed power unit, Serial No. 679,896, filed July 11, 1933, now Patent No. 2,164,818, issued July 4, 1939;

Don Heyer, Variable speed power unit, Serial No. 692,851, filed October 9, 1933, now Patent No. 2,191,200, issued February 20, 1940;

Don Heyer, Ventilated variable speed power unit, Serial No. 711,917, filed February 19, 1934, now Patent No. 2,205,975, issued June 25, 1940;

Don Heyer, Variable speed power unit, Serial No. 747,410, filed October 8, 1934, now Patent No. 2,205,976, issued June 25, 1940; and Don Heyer, Electric motor driven power unit, Serial No. 749,809, filed October 24, 1934, now Patent No. 2,205,977, issued June 25, 1940.

This application is directed to the same general types of mechanism disclosed in these prior applications, and is more particularly a continuation in part of application Serial No. 452,108, now Patent No. 2,214,854, and of application Serial No. 692,851, filed October 9, 1933, now Patent No. 2,191,200, issued February 20, 1940.

In the embodiments of the invention to be described hereinafter, the adjustable speed transmission is provided with a pair of adjustable diameter pulley structures. In one form of the construction disclosed, positive means are provided for adjusting the effective diameter of one of the pulley structures, and yielding means are provided for adjusting the effective diameter of the other of the pulley structures in accordance with the adjustment on the positively adjusted pulley structure. In another form of the construction disclosed, positive means are provided for adjusting the effective diameters of both of the pulley structures, and supplementary means are provided for adjusting the belt tension and for compensating for belt wear or elongation.

In many variable speed power applications it is desirable to enclose the variable speed transmission within a protecting casing to protect the belt and pulley mechanism from dirt, moisture, and other harmful materials; or to prevent the inadvertent entrance of foreign objects into the mechanism of the transmission. The practicability of variable speed transmissions of the type disclosed is dependent on the life of the driving belt, the ease with which the adjustment of the belt and pulley structures may be effected, and the accessibility of these parts for replacement or repairs. It is accordingly one of the objects of this invention to provide an enclosed variable speed power transmission in which means are provided for so supporting and enclosing the pulley structures and the driving belt that the belt and pulley structures are readily accessible for replacement, adjustment or repair.

The success of a variable speed transmission unit is dependent on the ease with which it may be adapted to the driven load. For any particular installation, the space available for mounting the variable speed transmission is dependent upon the nature of the driven machine. Thus if it is desired to provide a variable speed transmission, which may have general application, it becomes advantageous to provide a transmission unit which may be readily adapted to meet a large variety of mounting conditions. In some applications it may be desirable to mount the variable speed transmission so that the driving and driven shafts are arranged one above the other, the load driving shaft being either above or below the driving shaft. In other applications it may be desirable to mount the transmission so that the driving and driven shafts are in a horizontal plane; while still other conditions arise, when it is desirable to mount the transmission so that the load driving shaft is either above or below the driving shaft and horizontally displaced to one side of the driving shaft.

It is accordingly still another object of this invention to provide an enclosed variable speed transmission unit, in which the position of the load driving shaft may be varied with respect to the driving shaft to accommodate the mounting conditions of the driven load.

This invention possesses many other advantages, and has other objects which may be made more easily apparent from a consideration of several embodiments of the invention. For this purpose there are shown a few forms in the drawings accompanying and forming a part of the present specification. These forms will now be described in detail, illustrating the general principles of the invention; but it is to be understood that the detailed description is not to be taken in a limiting sense, since the scope of the invention is best defined by the appended claims.

Referring to the drawings.

Figure 1:
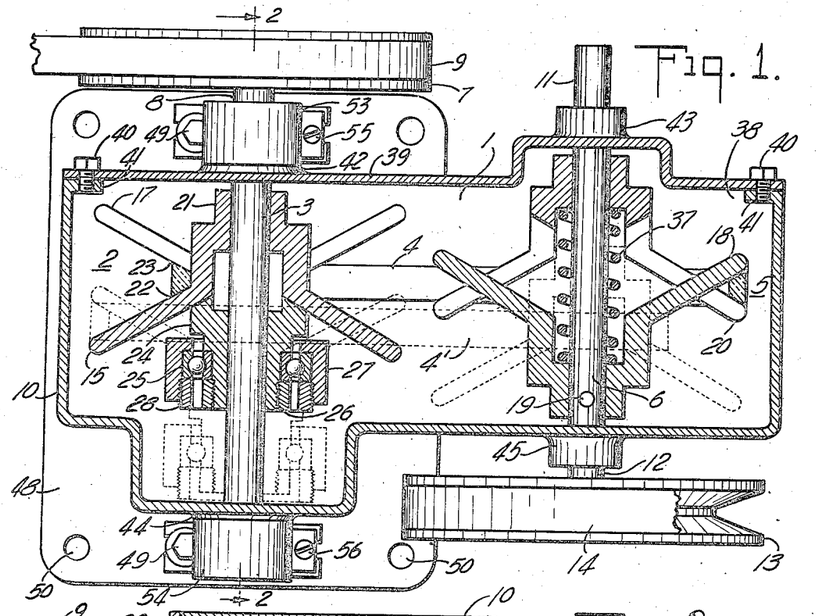
Figure 1 is a plan view, partly in section, of an adjustable speed power transmission, embodying the invention.
Figure 2:
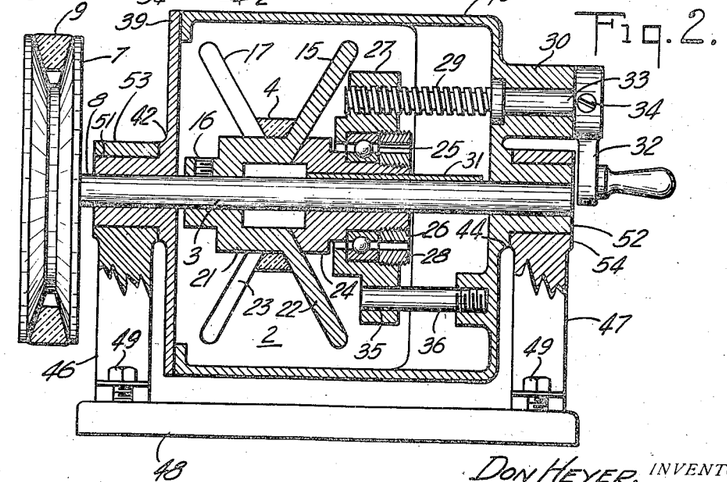
Figure 2 is a vertical sectional view, taken along the plane 2—2 of Figure 1.
Figure 3:
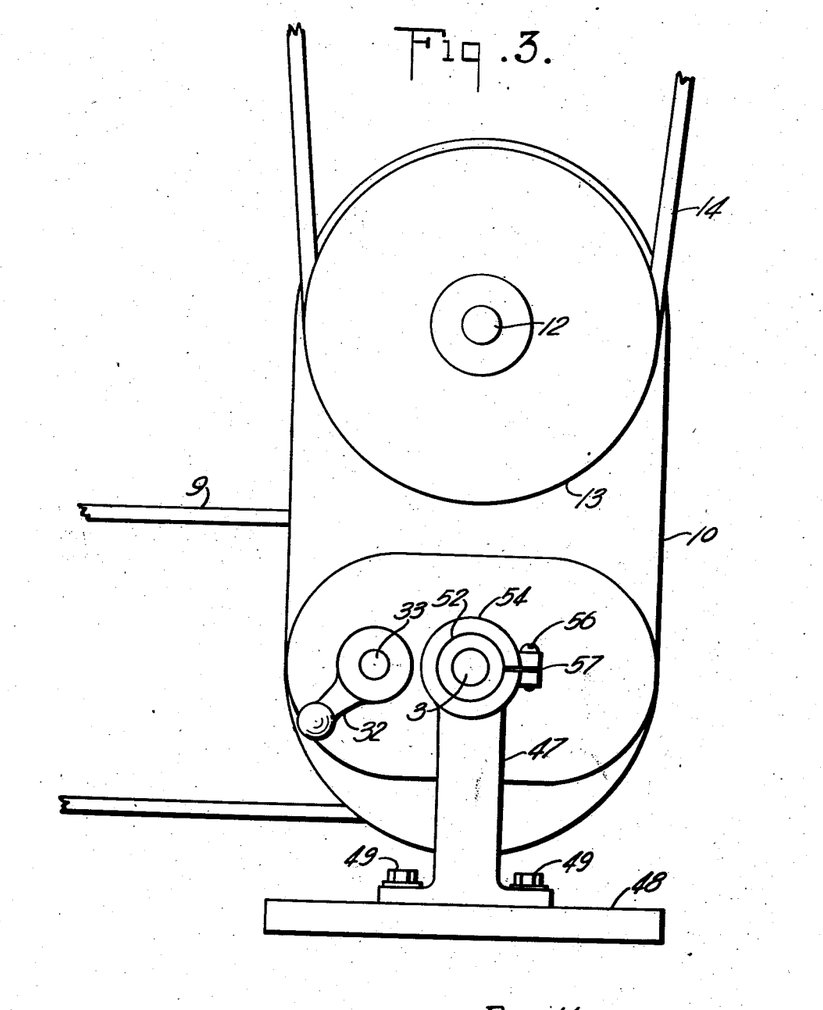
Figure 3 is a side elevation of the transmission unit illustrated by Figures 1 and 2, illustrating the manner in which the position of the load driving shaft may be adjusted with respect to the driving shaft.

Referring more particularly to the form of the invention disclosed in Figures 1 to 3, inclusive, the adjustable speed transmission 1 includes the driving pulley structure 2, mounted on the driving shaft 3, and which by means of the belt 4 drives the driven pulley structure 5 mounted on the driven shaft 6. Power may be applied to the transmission by the pulley 7, mounted on the end 8 of the driving shaft projecting outside of the transmission casing 10, and which in turn is driven by the V belt 9. The driven shaft 6 is provided with the load driving extensions 11 and 12, which project outside of the transmission casing and which may be directly coupled to the driven load; or if it is desired, the driven shaft 6 may be connected to the driven load by means of a belt and pulley drive. In the present instance the driven shaft 6 is provided with the pulley 13, mounted on the load driving extension 12, which by means of the belt 14 may be connected to any desired load.

Each of the adjustable pulley structures is provided with one pulley section, which is fixed to the supporting shaft, and one pulley section, which is axially adjustable with respect to the fixed pulley section, whereby an axial movement of the adjustable pulley section results in a corresponding variation of the effective pulley diameter. Thus the driving pulley structure 2 is provided with the pulley section 15, which is axially fixed to the driving shaft 3 by the set screw 16, and the pulley section 17, which is supported for axial movement. The axially adjustable pulley section 17 is suitably splined to the driving shaft 3 by means of the key 31 which prevents the rotation of the pulley section with respect to the shaft, but permits the axial movement thereof. The driven pulley structure likewise is provided with the pulley section 18, which is secured to the driven shaft 6 by the taper pin 19, and the pulley section 20 which is arranged for axial movement. It is to be noted that the axially fixed pulley sections 15 and 18 are faced in opposite directions. Thus when the diameter of the driving pulley structure is increased, the belt 4 moves up the inclined face of the pulley section 15 and down the inclined face of the pulley section 18 to the position $4^1$, to maintain the belt in substantial alignment with the driving and driven pulley structure.

In the form of the transmission disclosed, means are provided whereby a wide variation in pulley diameter may be obtained with the use of a narrow belt. For this purpose the pulley engaging face of each of the pulley sections is formed by a plurality of fingers, which are secured to the hub of the pulley section, and which are in crossed relationship to corresponding fingers formed on the opposite pulley section. Thus the pulley section 15 is provided with the hub 21, to which are secured the fingers 22, forming the pulley face and which are in crossed relationship to the fingers 23, secured to the hub 24 of the pulley section 17.

In order to provide means for adjusting the speed ratio of the variable speed transmission, positive means are provided for adjusting the effective diameter of the driving pulley structure, and yielding means are provided for adjusting the effective diameter of the driven pulley structure in accordance with the adjusted diameter of the driving pulley. To provide means for adjusting the axial position of the pulley section 17, the inner race of the bearing 25 is secured to the hub 24 of the pulley section by means of the lock nut 26, and the outer race of the bearing 25 is secured to the axially adjustable member 27 by means of the lock nut 28. It is obvious from the construction that an axial movement of the member 27 results in a corresponding axial movement of the pulley section 17 and in the resultant adjustment of the effective pulley diameter. The axial position of the member 27 is adjusted by means of the lead screw 29, which threadedly engages the member 27 and which is rotatably supported in fixed axial position by the bushing 30, formed on the casing 10. The crank arm 32 is in turn removably secured to the end 33 of the lead screw by means of the set screw 34. To provide a free engagement of the lead screw 29 with the adjustable member 27, the axially extending pin 36 is provided, which is threaded into the wall of the casing and which engages the hole 35 formed in the member 27. The pin 36 thus acts as a guide to prevent the rotation of the member 27; but permits an axial adjustment of the member 27 in response to a rotation of the crank arm 32.

The effective diameter of the driven pulley structure is resiliently adjusted by the compression spring 37, which is held between the hubs of the pulley sections 18 and 20, and which constantly urges the faces of these pulley sections into driving relation with the belt 4. It is obvious from the construction that if the pulley section 17 is moved toward the pulley section 15 in response to the rotation of the crank arm 32 and lead screw 29 that, the effective diameter of the driving pulley structure will be increased, and that the increased belt tension produced by this change in pulley diameter will cause the belt to wedge between the pulley sections 18 and 20 to decrease the effective diameter of the driven pulley structure. Conversely, a decrease in the effective diameter of the driving pulley structure will result in a decreased belt tension, which will permit the spring 37 to move the pulley section 20 toward the pulley section 18 to increase the effective diameter of the driven pulley structure.

While the pulley structure 2 has been described as the driving pulley structure, and the pulley structure 5 as the driven pulley structure, it is, of course, obvious that the operation of the transmission unit can be reversed, that is, the pulley structure 5 can be employed as the driving pulley structure, and the pulley structure 2 as the driven pulley structure. However, as has been pointed out in my co-pending application Serial No. 692,851, it is particularly advantageous to employ the positively adjusted pulley as the driving pulley and the resiliently adjusted pulley as the driven pulley of the variable speed transmission.

To provide access to the belt and pulley structures, the casing 10 is provided with the aperture 38, formed on one side thereof adjacent to the axes of the pulley structures. The aperture 38 is provided with the removable cover plate 39, which is secured to the casing by means of the bolts 40, which threadedly engages the ears 41 formed on the casing. The cover 39 is provided with the bearing bushings 42 and 43, which respectively support one end of the driving and driven shafts. The other end of the driving and driven shafts are respectively supported on the bearing bushings 44 and 45, formed on the casing member 10. It is obvious from the construction that the pulley structures and shafts can be removed from the casing through the aperture 38, upon the removal of the set screw 34, holding the crank arm 32 to the lead screw 29, and upon the removal of the bolts 40, holding the cover 39 to the casing.

In order to provide means whereby the position of the load driving shaft may be adjusted to suit the particular mounting conditions required by the driven load, the casing 10 and the enclosed variable speed transmission are pivotally mounted on the upright arms 46 and 47, which in turn are suitably secured to the base plate 48, as by means of the bolts 49. The base plate 48 is in turn provided with suitable bolt holes 50 by means of which the base plate may be secured to the supporting foundation.

To form the pivotal support between the upright arms 46 and 47 and the casing, the cover 39 and the casing 10 have respectively formed thereon the sub-shafts 51 and 52, which are respectively rotatably supported in the bearing bushings 53 and 54 formed on the upright arms 46 and 47. To provide means for holding the casing in the adjusted position, the bearing bushings 53 and 54 are split on one side and are respectively provided with the screws 55 and 56 for clamping the bearing bushings to the stub-shafts. This construction is best illustrated by Figure 3, in which bearing bushing 54, formed on the upright arm 47, has the slit 57 formed on one side thereof, thus permitting the bearing bushing to be clamped to the stub-shaft 52 by taking up on the screw 56.

It is obvious from the construction that the entire transmission casing can be rotated about the axis of the driving shaft 3 to provide the desired elevation and position of the load driving extensions 11 and 12 of the driven shaft, after which, the casing may be locked in the adjusted position by locking the stub-shafts 51 and 52 within the bearing bushings, formed on the supporting arm. Thus as illustrated in Figure 1, the driving and driven shafts are arranged in a horizontal plane, while in Figure 3 the position of the casing has been adjusted to position one of the shafts above the other. While the base plate 48 has been illustrated in a horizontal position, it is, of course, obvious that this base plate can be equally well secured to a wall or ceiling if it is desired.

Figures 4, 5:
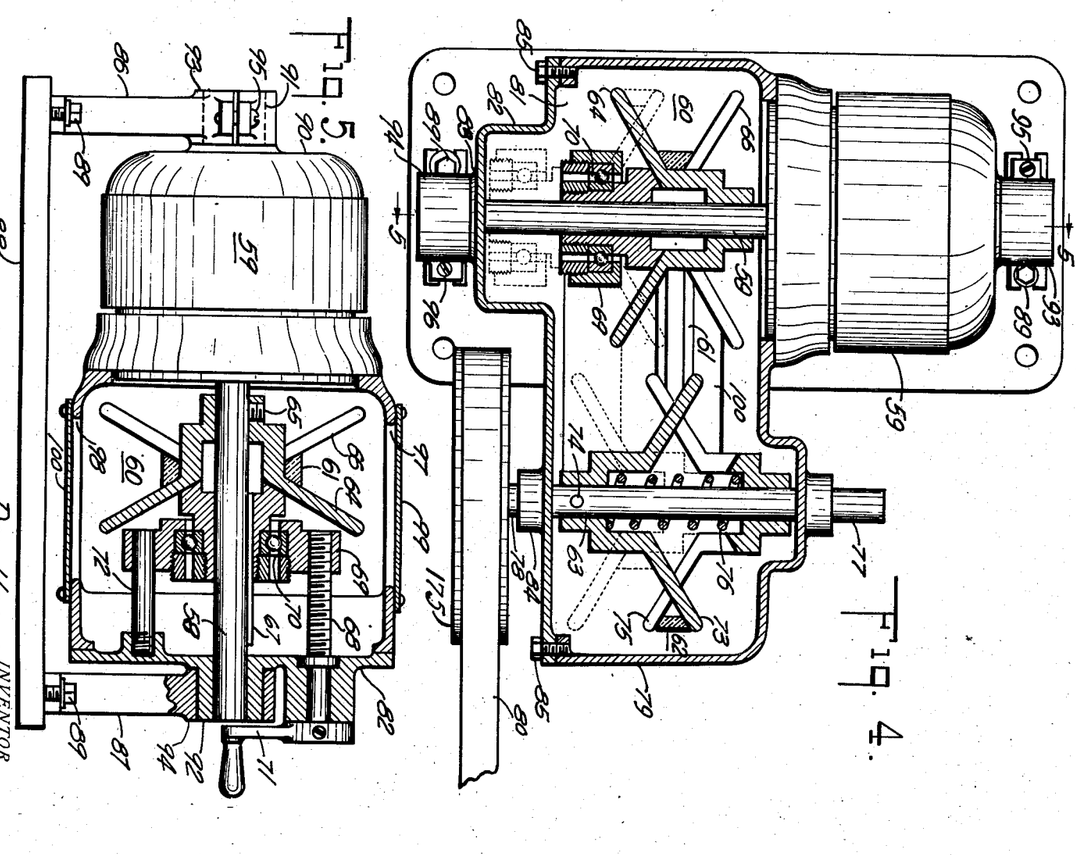
Figure 4 is a plan view, partly in section, of another form of variable speed transmission embodying the invention.
Figure 5 is a detailed sectional view, taken along the plane 5—5 of Figure 4.

Another form of the invention is illustrated by Figures 4 and 5. In this form the driving shaft 3 of Figures 1 to 3 is replaced by the driving shaft 58, which also forms the shaft of the driving electric motor 59. The driving shaft 58 has mounted thereon the adjustable pulley structure 60, which may in every way be identical with the driving pulley structure 2 of Figure 1. The driving pulley structure 60 engages the belt 61, which in turn drives the driven pulley structure 62, mounted on the driven shaft 63.

Similar to the construction of Figure 1, the driving pulley structure is provided with the pulley section 64, which is secured to the driving shaft by means of the set screw 65, and with the pulley section 66, which is splined to the shaft 58 by the key 67, but which is free to move axially. The axial position of the pulley section 66 is adjusted by means of the lead screw 68, which threadedly engages the axially adjustable member 69, which is axially fixed to the hub of the pulley section 66 by the bearing 70. As in the construction of Figure 1, the lead screw 68 has the crank arm 71 removably secured thereto, and the axial movement of the member 69 is guided by the rod 72.

The driven pulley structure is likewise similar to the driven pulley structure 5 of Figure 1, and includes the pulley section 73, which is secured to the driven shaft by the taper pin 74, and the pulley section 75, which is constantly urged toward the pulley section 73 by the compression spring 76.

The driven shaft 63 is provided with the load driving extensions 77 and 78, which project outside of the enclosing casing 79. The load driving extensions may be directly coupled to a driven load; or, as in the form illustrated, may have a pulley, such as the pulley 175, mounted thereon, which by means of the belt 80 drives the driven load.

To provide access to the belt and the pulley structures the casing 79 is provided with the aperture 81, which is provided with the removable cover 82. The removable cover 82 is provided with the bearing bushings 83 and 84, which respectively provide means for supporting one end of the driving and driven shafts. It is obvious that the driving belt and the adjustable pulley structures may be removed from the casing through the aperture 81, upon the removal of the bolts 85 holding the cover 82 to the casing.

To provide additional access to the belt and pulley structures, the casing 79 is provided with the apertures 97 and 98, formed in the opposite side walls, and which are respectively provided with the removable cover plates 99 and 100. It is obvious that the removable cover plates 99 and 100, together with the removable cover plate 82, provide means whereby ready access may be had to the belt and pulley structures for adjustment, replacement or repairs.

To provide means for adjusting the position of the load driving extensions of the driven shaft with respect to the driving shaft, the variable speed transmission and the driving electric motor 59 are pivotally supported on the upright arms 86 and 87, which in turn are secured to the base plate 88 by means of suitable bolts 89.

To provide means for pivotally supporting the driving motor and the transmission casing, the end bell 90 of the motor has the stub-shaft 91 formed thereon, and the cover plate 82 is provided with the stub-shaft 92. As in the construction of Figure 1, the upright arms 86 and 87 are respectively provided with the bearing bushings 93 and 94, which provide means for rotatably supporting the stub-shafts 91 and 92. The bearing bushings are split on one side and are provided with the clamping screws 95 and 96 for locking the stub-shafts in the adjusted position.

It is obvious from the construction that the position of the load driving extension of the driven shaft may be adjusted by rotating the driving motor and the transmission casing about the axis of the driving shaft 58, after which the casing may be locked in the adjusted position by locking the stub-shafts to the supporting arms.

Figure 6:
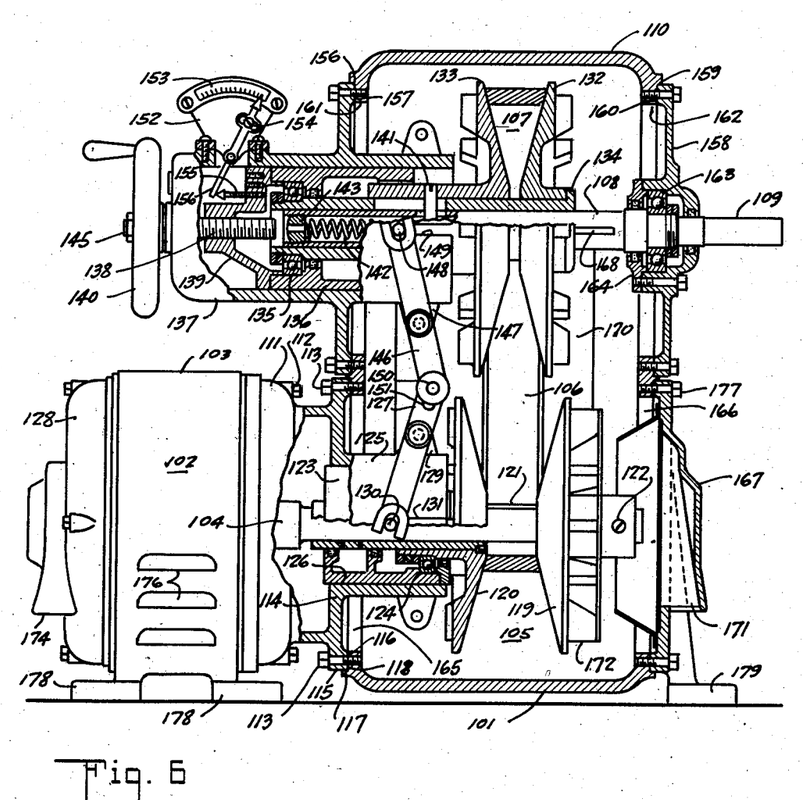
Figure 6 is a side elevation, partly in section, of another form of variable speed transmission embodying the invention.
Figure 7:
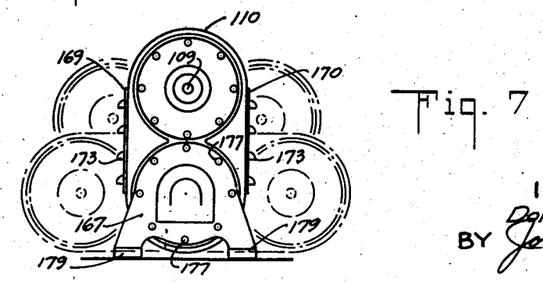
Figure 7 is a side elevation, taken from the right hand side of Figure 6, illustrating the manner in which the position of the load driving shaft may be varied with respect to the axis of the driving pulley of the transmission.

Still another form of the invention is illustrated by Figures 6 and 7. In this form positive means are provided for adjusting the effective diameter of both the driving and driven pulley structures, and supplementary means are provided for adjusting the belt tension and for compensating for belt wear. Referring to Figure 6, the variable speed power unit 101 is provided with the driving electric motor 102, having the frame 103, and a rotor which is in driving relation to the motor shaft 104. The motor shaft 104 has mounted thereon the adjustable pulley structure 105, which by means of the belt 106 drives the adjustable pulley structure 107, mounted on the driven shaft 108. The driven shaft 108 is provided with the load driving extension 109, which projects to the exterior of the casing 110, enclosing the belt and pulley structures.

The driving motor is secured to the casing 110 by means of the motor adapter bracket 111, which also supports the means for adjusting the effective diameter of the driving pulley. The frame of the motor is suitably secured to the adapter bracket 111 by the bolts 112 which pass through member 111 and which are threaded into the frame of the motor. The motor adapter bracket is in turn secured to the casing 110 by means of the bolts 113, which pass through the flange 114 and which are threaded into the wall of the casing. The member 111 is accurately located with respect to the casing by means of the engagement of the external cylindrical surface 115 and the radial surface 116, formed on the flange 114, respectively with the internal cylindrical surface 117 and the radial surface 118, formed on the casing.

The driving pulley structure 105 includes the pulley sections 119 and 120, which are suitably splined to the motor shaft, as by means of the key 121. The pulley section 119 may be secured to the motor shaft by the set screw 122, which passes through the pulley hub and which engages the shaft surface. The effective diameter of the pulley structure is adjusted by moving the pulley section 120 toward or away from the pulley section 119. The axial position of the pulley section 120 is adjusted by means of the axially adjustable bearing housing 123, which engages the bearing 124, secured to the hub of the pulley section. The member 111 has the neck 125 formed thereon, which is provided with the internal cylindrical surface 126 for supporting the axially adjustable bearing housing for axial movement. It is to be noted that the bearing 124 also provides means for rotatably supporting one end of the motor shaft 104. The other end of the motor shaft is supported by means of a bearing suitably secured within the end bell 128 of the motor.

The axial position of the bearing housing is adjusted by the forked lever 127, which is pivotally supported on the extending ear 129 of the motor adapter bracket, and which engages the oppositely positioned pins 130, secured to the bearing housing. The motor adapter bracket 111 is provided with the slots 131, which allow the pins 130 to move axially but which prevents the rotation of the bearing housing.

The driven pulley structure includes the pulley sections 132 and 133, which are in driving relation to the load driving shaft. The pulley section 132 is provided with the long bushing 134 which is suitably splined to the driven shaft 108 by means of the key 168. The pulley section 133 may in turn be suitably splined to the bushing 134 by means of a key, not shown, angularly displaced from the key 168. The bushing 134 has the bearing 135 secured thereto, which provides means for axially adjusting the pulley section 132. The bearing 135 is held within the axially adjustable bearing housing 136, which, in turn, is supported by the control housing 137. The control housing is supported on the frame on the power unit by means of the cylindrical and radial surfaces 156 and 157, formed on the casing 110, which are similar to those provided for the support of the motor adapter bracket 111.

The axial position of bearing housing 136 is adjusted by means of the rotatably supported lead screw 138, which threadedly engages the bearing cap 139 of the bearing housing. The lead screw has the end 145 projecting outside of the casing, and to which is secured the hand wheel 140. It is obvious from the construction that a rotation of the hand wheel 140 and of the lead screw secured thereto results in a corresponding axial adjustment of the bearing housing 136 and of the associated pulley section 132.

If it is desired, the pulley section 133 may be axially fixed to the driven shaft. However, in the present instance the pulley section 133 provides means for compensating for belt wear and for determining the initial belt tension. For this purpose the hub of the pulley section is provided with the pin 141, which passes through appropriate slots formed in the driven shaft and in the bushing 134. The pulley section 133 is urged into contact with the driving belt by means of the compression spring 142, which is interposed between the screw plug 143 and pin 141. The force exerted by the spring 142 can be adjusted by the rotation of the screw plug, and the spring may be suitably designed to provide an axial force sufficiently great to maintain pulley sections 132 and 133 in active driving relation to the belt, under the greatest load normally encountered.

Suitable means are provided for interlocking the adjustment of the driving and driven pulley structures. In the present instance the forked lever 146 is provided, which is pivotally supported on the extending ear 147 of the control housing 137, and which engages the oppositely positioned pins 148, secured to the bearing housing 136. The control housing 137 is provided with the slots 149, which permit the axial movement of pins 148, but which prevent the rotation of the bearing housing. By means of the construction provided an axial movement of bearing housing 136 results in a pivotal movement of the forked lever 146. The movement of forked levers 127 and 146 is inter-locked by the common pivot pin 150, which is secured to forked lever 146 and which engages the slotted end 151 of the lever 127. The forked levers 127 and 146 may be so proportioned that an increase in the effective diameter of one of the pulley structures results in a compensating decrease in the effective diameter of the other pulley structure.

It is obvious from the construction that the effective diameters of the driving and driven pulley structures are simultaneously adjusted to vary the speed ratio of the variable speed power unit, when the lead screw 138 is rotated by the manipulation of the hand wheel 140.

The adjustment of the speed ratio may be indicated by the speed indicator 152, which is removably secured to the control housing 137. The speed indicator 152 is provided with the graduated scale 153 and the pivotally mounted pointer 154, which is actuated by the head of the screw 155, secured to the bearing housing 136. A suitable torsion spring, not shown, is provided for maintaining the end 156 of the pointer in contact with the head of the screw 155. It is obvious from the construction that an axial movement of the bearing housing 136 results in a corresponding pivotal movement of the pointer 154.

One end of the driven shaft 108 is supported by the bearing 135. The other end of the driven shaft is supported by the bearing 163, which is held within the bearing housing, formed by the cover plate 158 and the bearing cap 164. The cover plate 158 is removably secured to the wall of the casing 110, and is accurately located with respect to the casing by the engagement of the internal cylindrical surface 159 and the radial surface 160, formed on the casing, with engaging cylindrical and radial surfaces formed on the cover plate. The cylindrical and radial surfaces 159 and 160 may in every way be equivalent to the cylindrical and radial surfaces 156 and 157, provided for supporting the control housing 137. The casing is provided with the apertures 161 and 162, respectively formed adjacent to the control housing 137 and the cover plate 158. It is obvious from the construction that the apertures provide substantial access to the interior of the casing. When it is desired to replace the driving belt the cover plate 158 may be removed and the belt passed over the end of the driven shaft 108; or the pivot pin 150, which interlocks the levers 127 and 146, may be removed, after which, the control housing 137 may be removed to permit the passing of the belt over the end of the bearing housing 136.

The casing is also provided with the aperture 165 adjacent to the flange 114, formed on the motor adapter bracket, and the aperture 166 formed in the opposite facing wall. The aperture 166 is covered by the casing support bracket 167, which is removably secured to the wall of the casing by a plurality of bolts 177. It is obvious from the construction that the driving belt may be readily removed from the driving pulley structure, by the removal of the support bracket 167, after which, the belt may be passed over the end of the driving shaft 104.

To provide additional access to the belt and pulley structures, the opposite side walls of the casing have apertures formed therein, which are provided with the removable cover plates 169 and 170.

To provide means for cooling the belt and pulley structures the casing support bracket 167 has the downwardly directed air intake passage 171 formed thereon, through which air may be drawn into the casing by means of the fan 172 rotated with the driving pulley structure. The air may be discharged from the casing through the downwardly directed air discharge passages 173 formed in the cover plates 169 and 170.

The motor ventilation may be maintained by means of the air intake passage 174 formed on the end bell 128 and the downwardly directed air discharge passages 176 formed on the sides of the motor.

The motor 102 has the feet 178 formed thereon, which provide means for supporting the frame of the motor, and which also provide means for supporting one side of the transmission casing. The other side of the transmission casing is supported by the casing support bracket 167, which has the feet 179 formed thereon for that purpose.

To provide means whereby the position of the casing and of the load driving extension 109 may be adjusted with respect to the axis of the motor shaft, means are provided whereby the motor frame 103 and the casing support bracket 167 may be secured to the casing 110 in a plurality of relative angular positions. For this purpose a plurality of the bolts 112 and 177 are provided, which are spaced at equal angular intervals. Thus the position of the casing 110 may be adjusted with respect to the axis of the motor shaft by angular increments equal to the angle between the adjacent bolts. Thus, as illustrated by Figure 7, if the angle between the adjacent bolts 177 is equal to 45°, the position of the casing and load driving extension 109 may also be adjusted by increments of 45°. Or if it be desired to provide a larger number of positions for the load driving shaft, the casing 110, and the motor frame may be provided with a greater number of tapped holes than there are bolts. Then the position of the casing may be varied by angular increments equal to the angle between the adjacent tapped holes.

It is obvious from the construction that, the position of the transmission casing and of the load driving shaft 109 may be adjusted with respect to the axis of the motor shaft by removing the bolts 112 and 177, holding the motor frame and the motor support bracket to the transmission casing, and by then securing these members in the desired angular position to the casing. It is to be noted that the hand wheel 140 will be accessible for adjusting the speed ratio, irrespective of the angular position of the casing. It is also to be noted that, the speed indicator 152 is removably secured to the control housing 137 and that the pointer 154 is substantially in the plane of the axes of the driving and driven shafts. Thus if the casing is positioned so that the scale 153 is not visible, the speed indicator 152 may be removed and the torsion spring reversed, after which, the indicator may be turned around to bring the scale into view.

Figure 8:
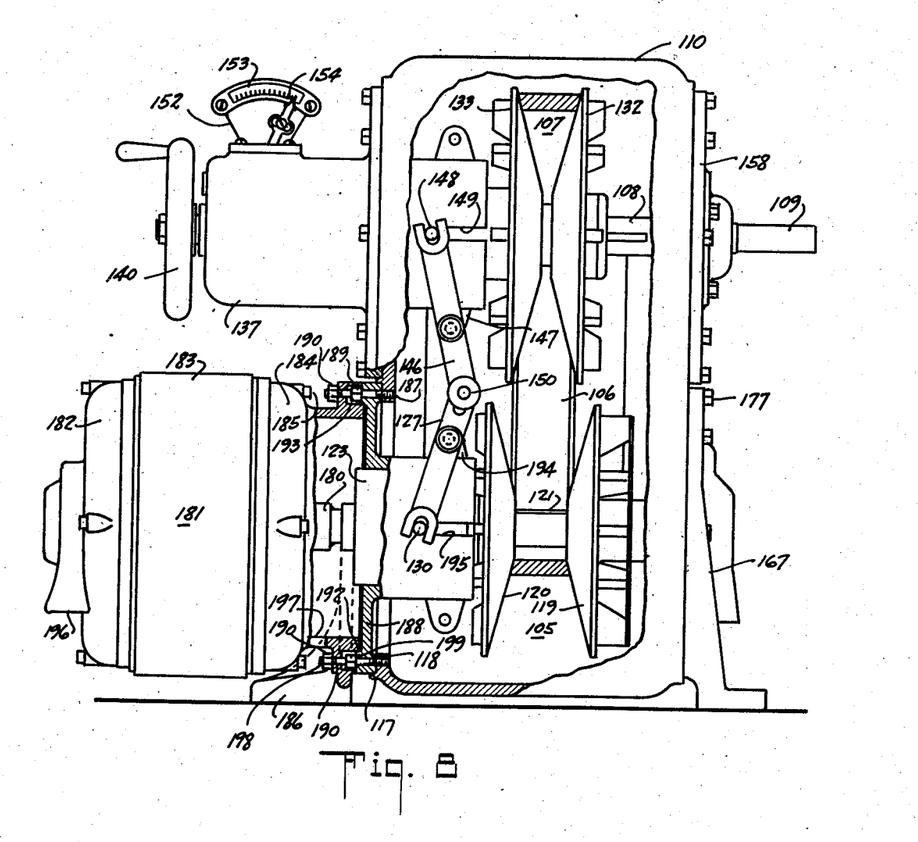
Figure 8 is a side elevation, partly in section, of another form of variable speed transmission embodying the invention.

Figure 8 illustrates a form of the variable speed transmission which, except for the means provided for supporting the transmission casing, is similar to that illustrated by Figures 6 and 7. Referring to Figure 8, the variable speed transmission includes the driving pulley structure 105, the driven pulley structure 107, and the driving belt 108, which may in every way be identical with the corresponding members in the construction of Figures 6 and 7. As in the construction of Figures 6 and 7, the pulley section 132 is axially adjusted in response to the rotation of the hand wheel 140, and the adjustment of the driving and driven pulley structures is interlocked by the pivotally supported levers 146 and 127. The driven shaft 108 is supported by the control housing 137 and the cover plate 158, which in turn are secured to the transmission casing 110.

The driving pulley structure 105 is mounted on the shaft 180 of the driving electric motor 181. As in the construction of Figures 6 and 7, one end of the motor shaft 180 is rotatably supported by means of a bearing secured within the axially adjustable bearing housing 123, and the other end of the shaft is rotatably supported by a bearing suitably secured within the end bracket 182. In this form the axially adjustable bearing housing 123 is supported for axial movement by the flange member 188, which has the ear 194 formed thereon for pivotally supporting the lever arm 127, and which is provided with the slots 195 for guiding the pins 130.

The motor frame 183 is not provided with feet; but the supporting member 184 is provided, which is secured to the motor frame by the bolts 185, and which provides means for supporting both the motor frame and one side of the transmission casing. For this purpose the member 184 is provided with the feet 186. The other side of the transmission casing is supported by the casing support bracket 167, as in the construction of Figures 6 and 7. The supporting member 184 is secured to the transmission casing by means of the studs 187, which also provide means for securing the flange member 188 to the casing. The studs 187 are threaded into the wall of the casing, and have the bolt head portion 189 formed thereon for holding the member 188 to the wall of the transmission casing. The studs are also provided with the threaded ends 198, which pass through the holes 191 formed in the supporting member 184. Thus the member 184 is in turn secured to the member 188 by the nuts 190, which engage the threaded ends 198 of the studs. The supporting member 184 also is provided with the ventilating passage 197, which together with the ventilating passage 196, formed in the end bell 182, provide means for cooling the driving motor.

The flange member 188 is accurately located with respect to the transmission casing by the cylindrical surface 117 and the radial surface 118, formed on the casing, and which engage corresponding surfaces formed on member 188. The supporting member 184 and the motor supported thereby are in turn accurately located with respect to the member 188 by the engagement of the internal cylindrical surface 192 and the radial surface 199, formed on the member 188, with corresponding surfaces formed on the member 184.

It is obvious from the construction that the position of the transmission casing 110 and of the load driving extension 109 may be adjusted with respect to the supporting members 184 and 167 by adjusting the angular position of these members with respect to the casing. This may be accomplished by removing the nuts 190 and the bolts 177, after which, the transmission casing may be rotated to the desired position and again secured to the members 184 and 167.

To provide means whereby the member 184 may be secured to the transmission casing in a large number of positions, a larger number of the holes 191 may be provided than there are studs 198, and the bolt head portions 189 of the studs may be accommodated within the annular groove 193, formed in the member 184.

Other forms, similar to those shown in Figs. 3 and 8, may be provided wherein provision is made for interchanging the driving shaft and the driven shaft. This feature is generally disclosed in my copending application for Variable speed power unit, Serial No. 747,410, filed Oct. 8, 1934.

I claim:

1. In an adjustable speed drive having a driving shaft, a driven shaft, a pair of pulley structures in respective axial driving relation to said shafts and a belt for transmitting power between said pulley structures, at least one of said pulley structures having an adjustable effective diameter, and in which means are provided for adjusting the effective diameter of said adjustable pulley structure to adjust the speed ratio, the combination therewith of a casing enclosing said pulley structures and providing means for supporting said shafts, said casing being relatively long to provide a substantial space between said shafts, and means for pivotally supporting said casing about the axis of one of said shafts whereby the casing may be swung about said shaft to vary the position of the other of said shafts to adapt the space occupied by the casing to operating requirements.

2. In an adjustable speed drive, a driving shaft and a driven shaft, a pair of variable diameter pulley structures in respective axial driving relation to each of said shafts, each of said pulley structures including a pair of pulley sections having opposed inclined belt-engaging faces, forming by relative axial adjustment variable effective pulley diameters, a belt actively engaging said pulley structures, means for adjusting the relative effective diameters of said pulley structures, a casing enclosing said pulley structures, means cooperating with said casing for rotatably supporting said shafts, said casing being relatively long to provide a substantial space between said shafts, and means for supporting the casing, said supporting means including means whereby the position of one shaft is maintained fixed while the position of the other shaft may be altered to adapt the space occupied by the casing to operating requirements.

3. In an adjustable speed drive having a driving shaft, a driven shaft, a pair of pulley structures in respective axial driving relation to each of said shafts and a belt for transmitting power between said pulley structures, at least one of said pulley structures having an adjustable effective diameter, and in which means are provided for adjusting the effective diameter of said adjustable pulley structure to adjust the speed ratio, the combination therewith of a frame for supporting said shafts, said frame being relatively long to provide a substantial space between said shafts, means for supporting the frame, and means for optionally securing said frame to the supporting means with one of said shafts in any of a plurality of positions, the position of the other of said shafts being unchanged, whereby to alter the relation of the space occupied by the casing to operating requirements.

4. In an adjustable speed drive having a driving pulley structure, a driven pulley structure and a belt for transmitting power between said pulley structures, at least one of said pulley structures having an adjustable effective diameter, and in which means are provided for adjusting the effective diameter of said adjustable pulley structure to adjust the speed ratio, the combination therewith of a load driving shaft driven by said driven pulley structure, a casing enclosing said pulley structures and providing means for supporting said load driving shaft, said casing being relatively long to provide a substantial space between said pulley structures, and means to support said casing, said supporting means permitting the casing to be oscillated through a large angle about the axis of one shaft, whereby the angular position of the other shaft relative thereto may be altered to alter the relation of the space occupied by the casing to operating requirements.

5. In an adjustable speed drive having a driving shaft, a driven shaft, a pair of pulley structures in respective axial driving relation to each of said shafts and a belt for transmitting power between the pulley structures, at least one of said pulley structures having an adjustable effective diameter, and in which means are provided for adjusting the effective diameter of said adjustable pulley structure to alter the speed ratio, the combination therewith of a casing enclosing the pulley structures and providing means for rotatably supporting said shafts, said casing being relatively long to provide a substantial space between said shafts, means for rotatably supporting the casing concentrically with one of the shafts whereby the position of the other shaft may be varied to adapt the space occupied by the casing to operating requirements, and means for securing the casing against rotation.

6. In an adjustable speed drive having a driving shaft, a driven shaft, a pair of pulley structures in respective axial driving relation to each of said shafts and a belt for transmitting power between the pulley structures, at least one of said pulley structures having an adjustable effective diameter, and in which means are provided for adjusting the effective diameter of said adjustable pulley structure to alter the speed ratio, the combination therewith of an elongated frame including bearings adjacent the ends of the frame rotatably supporting said shafts, the frame having cylindrical supporting surfaces on opposite sides and concentric with one of said shafts, supporting means for the frame including cylindrical surfaces adapted to coact with the cylindrical surfaces on the frame whereby the latter is rotatably supported, and means to secure the frame in any one of a plurality of positions.

7. In an adjustable speed drive having a driving shaft, a driven shaft, a pair of pulley structures in respective axial driving relation to each of said shafts and a belt for transmitting power between the pulley structures, at least one of said pulley structures having an adjustable effective diameter, and in which means are provided for adjusting the effective diameter of said adjustable pulley structure to alter the speed ratio, the combination therewith of a casing enclosing the pulley structures and having bearings for rotatably supporting said shafts, said casing being relatively long to provide a substantial space between said shafts, means for supporting said casing to permit one shaft to be revolved about the other whereby their relative positions may be altered and the relation of the space occupied by the casing to operating requirements altered, and means to optionally maintain the shafts in adjusted position.

8. In an adjustable speed drive having a driving shaft, a driven shaft, a pair of pulley structures in respective axial driving relation to each of said shafts and a belt for transmitting power between the pulley structures, at least one of said pulley structures having an adjustable effective diameter, and in which means are provided for adjusting the effective diameter of said adjustable pulley structure to alter the speed ratio, the combination therewith of means for altering the relative positions of the shafts, said means comprising a support bracket, bearing means associated with said bracket to rotatably support one of the shafts independently of the casing, means on said bracket whereby the casing may be revolved about the axis of the supported shaft and means to secure the casing to the bracket in any of a plurality of positions.

9. In a variable speed transmission device, a driving shaft, a driven shaft, pulley structures respectively in driving relation to the shafts, a casing for supporting and enclosing said structures, so that the axes of the shafts are in spaced parallel relation, said casing being relatively long to provide a substantial space between the shafts, and means for supporting one of the shafts and thereby supporting the casing, said means having provisions for supporting the casing at any of a number of angular positions about the axis of said one of the shafts, whereby to alter the relation of the space occupied by the casing to operating requirements.

10. In a variable speed transmission device, a driving shaft, a driven shaft, pulley structures respectively in driving relation to the shafts, an elongated casing by the aid of which said shafts are supported, so that the axes of the shafts are in spaced parallel relation, a standard for supporting the casing, and a bearing structure adjacent one end of the casing for one of the shafts and supported by the standard, said casing being adjustably mounted on the standard so that the casing may optionally assume any one of a number of angular positions with respect to the axis of the said one of the shafts, to adapt the space occupied by the casing to operating requirements.

11. In a variable speed transmission mechanism, a driving shaft, a driven shaft, pulley structures respectively in driving relation to the shafts, an elongated casing enclosing said structures, and aiding in supporting said shaft, a bearing structure adjacent one end of the casing for one of the shafts, a standard supporting the bearing structure, and means for attaching said standard, bearing structure and casing so that the casing may be supported in any one of a number of angular positions with respect to the axis of the said one of the shafts, to adapt the space occupied by the casing to operating requirements.

12. In a variable speed transmission, a driving shaft, a driven shaft, pulley structures respectively in driving relation to the shafts, at least one of said pulley structures having an adjustable effective diameter, an elongated casing enclosing said pulley structures, a bearing structure adjacent one end of the casing for one of the shafts, a standard exterior of the casing, for supporting said bearing structure, and means for detachably securing the bearing structure, the standard and the casing together so that the casing may be supported by the standard in any one of a number of angular positions with respect to the axis of the said one of the shafts, to adapt the space occupied by the casing to operating requirements.

13. In a variable ratio transmission device, a driving shaft, a driven shaft, pulley structures respectively in driving relation to the shafts, a frame for supporting said structures so that the axes of the shafts are in spaced parallel relation, a bearing structure for one of the shafts, a standard for supporting the bearing structure, said frame being adjustably mounted on the bearing structure so that the frame may optionally assume any one of a number of angular positions with respect to the axis of said one of the shafts, to adapt the space occupied by the casing to operating requirements.

14. In a variable ratio transmission device, a driving shaft, a driven shaft, pulley structures respectively in driving relation to the shafts, a frame for supporting said structures so that the axes of the shafts are in spaced parallel relation, a bearing structure for supporting one of the shafts and secured to the frame, a standard adapted to be secured to the bearing structure in any one of a number of positions, whereby the bearing structure and frame are adjustably supported by the standard, to adapt the space occupied by the casing to operating requirements.

DON HEYER.